United States Patent
Xujiang et al.

(10) Patent No.: US 6,960,292 B2
(45) Date of Patent: Nov. 1, 2005

(54) ACTIVE WATER PREPARATION DEVICE

(76) Inventors: Guocai Xujiang, Jiangsu University of Science and Technology, Wenhua Building 301 Dentu Road, Zhenjiang, Jiangsu (CN); Zhengke Jiang, Jiangsu University of Science and Technology, Wenhua Building 301 Dantu Road, Zhenjiang, Jiangsu (CN); Zhiwei Hou, Jiangsu University of Science and Technology, Wenhua Building 301 Dantu Road, Zhenjiang, Jiangsu (CN)

( * ) Notice: Subject to any disclaimer, the term of this patent is extended or adjusted under 35 U.S.C. 154(b) by 0 days.

(21) Appl. No.: 10/445,545

(22) Filed: May 27, 2003

(65) Prior Publication Data

US 2004/0007511 A1 Jan. 15, 2004

Related U.S. Application Data

(63) Continuation of application No. PCT/CN01/01300, filed on Sep. 3, 2001.

(30) Foreign Application Priority Data

Dec. 11, 2000 (CN) ........................................ 00261837 U

(51) Int. Cl.$^7$ ................................................. C02F 1/48
(52) U.S. Cl. .......................... 210/149; 210/222; 99/287; 366/145; 366/273
(58) Field of Search ................................. 210/143, 149, 210/222, 223, 695; 62/126, 392; 426/237, 610; 366/145, 273; 99/287

(56) References Cited

U.S. PATENT DOCUMENTS 5,647,974 A * 7/1997 Shim et al. .................. 210/103
5,816,058 A * 10/1998 Lee et al. ..................... 62/126
6,171,490 B1 * 1/2001 Kim ........................... 210/223

FOREIGN PATENT DOCUMENTS

| CN | 2116416 U | 9/1992 |
|---|---|---|
| CN | 2119150 U | 10/1992 |
| CN | 2124907 U | 12/1992 |
| CN | 2127279 Y | 2/1993 |
| CN | 2164902 Y | 5/1994 |
| CN | 2167983 Y | 6/1994 |
| CN | 2170698 Y | 7/1994 |
| JP | 63-16090 | 1/1988 |
| JP | 7-8966 | 1/1995 |
| JP | 9-174059 | 7/1997 |

* cited by examiner

Primary Examiner—Joseph Drodge
(74) Attorney, Agent, or Firm—Dorsey & Whitney LLP

(57) ABSTRACT

This practical new type deals with water treatment technology. It is applied to the field of human health care and to the water supply system for living beings that depend on water. Its features are: Thermostat Sleeve 2 is installed between Outer Casing 1 and Inner Flask 6. Along the circumference of Thermostat Sleeve 2, a number of rectangular slots are made perpendicular to the circumferential plane. Permanent Magnet 5 and Magnetic Conductor 4 are installed in the rectangular slots of Thermostat Sleeve 2. Electric Motor 9 is mounted on Outer Cover Base 18. Mounted on the shaft of Electric Motor 9, there is Worm 19 and Worm Gear with Shaft 20; Stirrer 22 is installed on Worm Gear with Shaft 20. The advantages of this device include the fresh structure and the evident effect: Drinking the active water in hospitals resulted in a total effective rate 100%, and applying to plant growing increased the production by 40~103%.

5 Claims, 4 Drawing Sheets

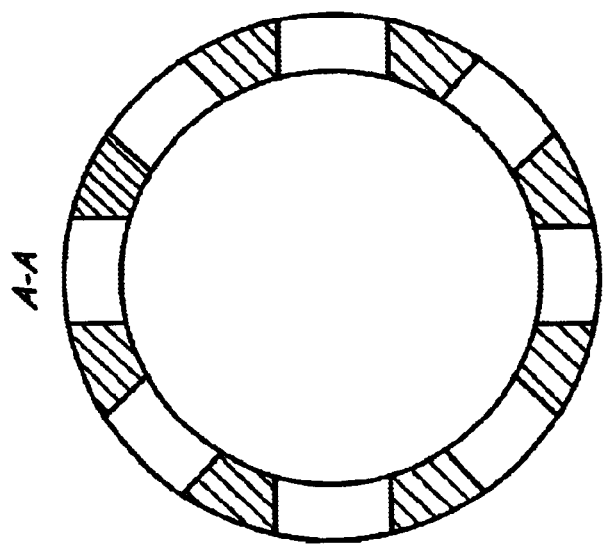
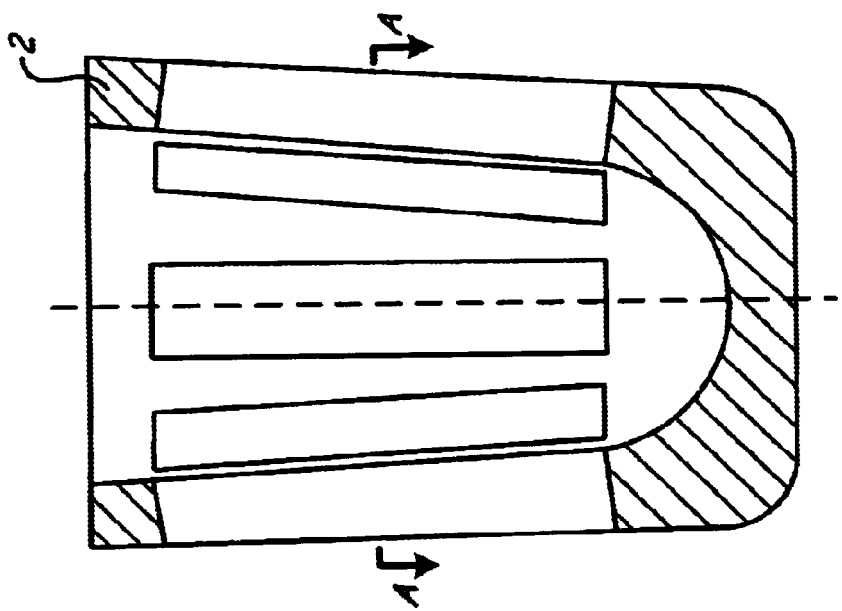

ACTIVE WATER PREPARATION DEVICE

CROSS-REFERENCE TO RELATED APPLICATION(S)

This application is a continuation of International Patent Application PCT/CN01/01300, filed on Sep. 3, 2001, which claims priority to Chinese Patent Application 00261837.0, filed on Dec. 11, 2000, the contents of both are hereby incorporated by reference.

FIELD OF THE INVENTION

This practical new type of device for active water preparation deals with water treatment technology. It is applied to the field of human health care and to the water supply system for living beings that depend on water.

BACKGROUND OF THE INVENTION

Water is the source of life, and the existence of water is an essential prerequisite of life forms. Life originated from water, and the life span is determined by water and its quality.

The human body is composed, so to speak, of water: $2/3$ of the body weight is water. Water is not only the origin of life and essence of health, but also the root of disease and cause of death. Life and health demand water in quantity, and in quality as well. Good water, living water and quality water endow us human beings with health and longevity; bad water, dead water and inferior water bring us sickness and death. In a broad sense, the vitals of human health and longevity lie entirely in water; also the causes of disease and death lie mostly in water. For health and longevity, it is necessary to drink good water. One of the basic conditions of good water, living water and quality water is that the polymerized form of water molecules should be small, that is to form small groups of water molecules.

Water is made up of two hydrogen molecules and one oxygen molecule. Water does not exist in the form of single molecules, but in groups of molecules. The structure of the group is not permanent, but changeable. Separating and gathering in some conditions are characteristic of the existence and movement of water molecules. Tap water for everyday drinking, well water, rain water and other kinds of natural water are made up of multiple water molecules linked up by hydrogen bonds, gathering into groups as their form of existence, hence the so-called big molecule group water. If a certain amount of energy is exerted or transmitted to a water molecule group, then the angle between the two chemical bonds of the hydrogen and oxygen atoms will be varied, and the hydrogen bond of molecules will also be broken, which beaks down a big molecule group into small molecule groups. Compared with the big molecule group water, the small molecule group water has a stronger penetration, a higher solubility, a higher polymerization, a higher hydrogen absorption and a higher conductivity. This small group water possesses the following fundamental functions of human health care:

1. Promote the metabolism of cells in the human body. Compared to the big molecule group water, the small molecule group water penetrates the cell membrane more easily, to exchange with water within the cell, bringing nutrients more quickly into the cell or dissolving them more fully in the cell, and removing the metabolic wastes efficiently from the cell. The wastes are dissolved in the bodily liquid, discomposed in urine and sweat to be discharged from the body. Thus the body gets rid of old wastes, and avoids the risk of getting diseases, hence a function of poison exclusion and face maintenance.

2. Strengthen the human immunities. The small molecule group water can hold back free radicals in the human blood and reduce the free radicals accumulated in the human body, balancing the super-oxidation and anti-oxidation systems in human cells. It increases the immune ball protein concentration in the body, facilitating the immunity of cells and bodily liquids. Besides, it stabilizes the electric charges on protein molecules and the hydrate layers on their surface, slows down the protein denaturing process, and improves the human ability to resist diseases and decelerate the aging process.

3. Improve the biochemical reaction of blood. The small molecule group water can prevent the inner skin cells of the artery from damage, restrain the cholesterol from rising, and prevent the heart and brain arteries from hardening. Drinking the small molecule group water for a long time can reduce the blood sugar, cholesterol and triglyceride concentration, raise the high dense lipoprotein (HDL) concentration, and improve the biochemical reaction of blood; it can also remove the deposit on the wall of blood vessels, soften blood vessels, make the blood circulation easy, and prevent the thrombus from forming in the heart and brain.

4. Relieve or eliminate the intestine function disorder. Drinking the small molecule group water can promote the intestine movement, strengthen the contracting force of the smooth muscle, and promote the defecating function, so as to relieve or eliminate constipation.

The small molecule group water has a wide range of essential health care effects, and noticeable active effects on cultivating and growing other living beings. For example, when growing vegetables, it increases the product greatly, and improves their quality as well.

The technique for preparing this active water (the small molecule group water) and the preparation device are created original.

SUMMARY OF THE INVENTION

The purpose of this new type is to provide a device with layers of web-shaped magnetic circuits combined into one container for preparing the small molecule group water either for human beings or for living beings.

The purpose is implemented in this way: In a cylindrical container, along the circumferential wall, permanent magnets of high magnetic energy are arranged one by one with one pole next to the opposite pole, forming a web-shaped magnetic circuit. Thus a static gradient magnetic field is built in the container. Pour some warm boiled water into the container. Stir the water with an automated stirrer at a certain speed for a period of time. The water, which is flowing in the magnetic field at a speed, is cut intensely by magnetic force lines, and becomes the small molecule group water needed by the human body (human active water). Pour some tap water or other kinds of natural water into the container. Stir the water at another speed for some time, and you will obtain the small molecule group water for plants to grow (biological active water). Though they belong to the small molecule group water, the human active water differ from the biological water in that each of them has its own active point, because they were treated in the magnetic field at different speeds for different time spans.

BRIEF DESCRIPTION OF THE DRAWINGS

The concrete structure of this practical new type is shown in the following drawings and examples:

FIG. 4—Profile section of the thermostat sleeve;
FIG. 5—Top view of the thermostat sleeve;

DETAILED DESCRIPTION OF THE INVENTION

The concrete structure of this new type is described with the drawings attached below:

As shown in FIGS. 1~7 this practical new type consists of Outer Casing 1, Thermostat Sleeve 2, Magnetic Field Shield 3, Magnetic Conductor 4, Permanent Magnets 5, Inner Flask 6, Outer Cover 7, Power Supply Outlet 8, Electric Motor 9, a Micro Humming Loudspeaker 10 for timing and announcing the completion of the stir, a Speed Governor 11 connected to the Electric Motor 9 for controlling its revolution speed, a Power Switch 12 connected to the Electric Motor 9 for controlling its starting up, a Battery Box 15 comprising a Cover Hinge 13, a Cover Plate 14, and a Battery 16, Circuit Board for Electronic Control 17 for automatically controlling the stirring speed and time, Outer Cover Base 18, Worm 19, Worm Gear with Shaft 20, Oiled Bearing 21, and Stirrer 22. Outer Casing 1 is of cylindrical shape.

Figure 1:
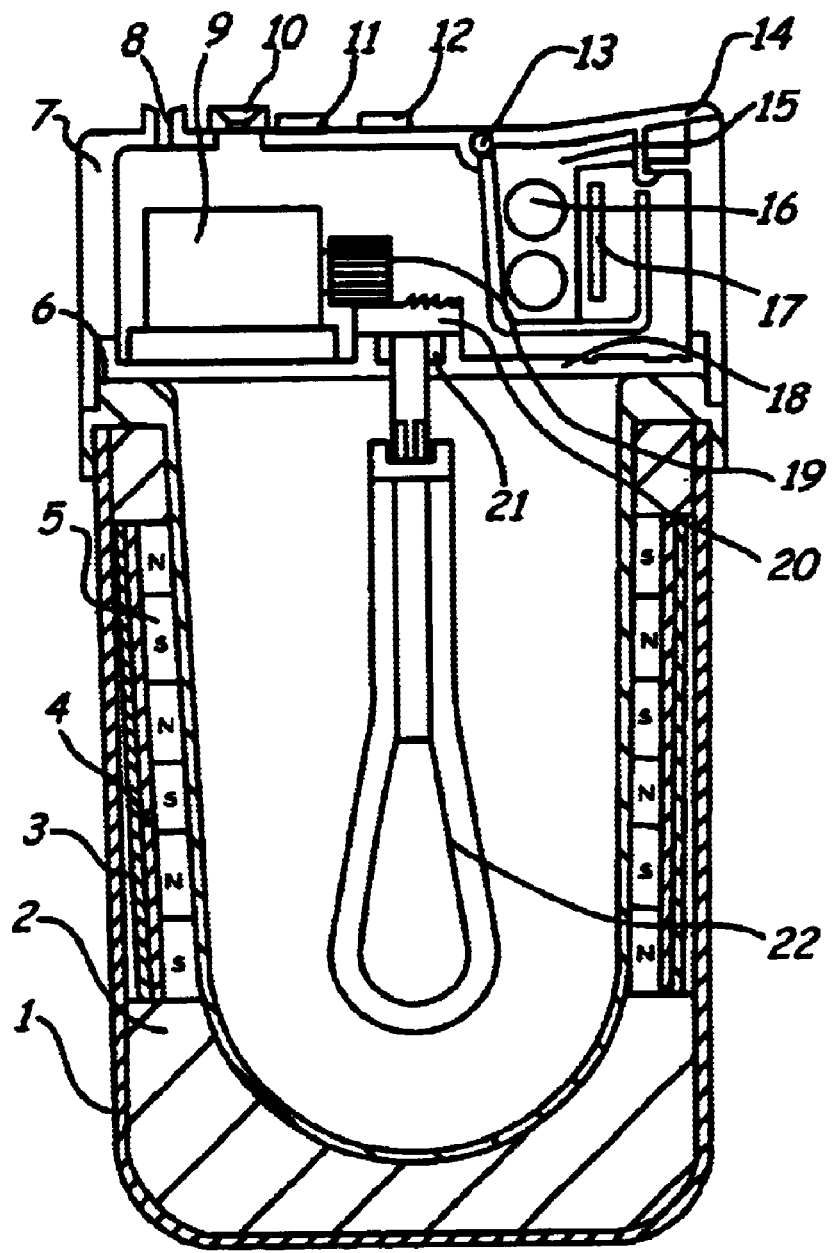
FIG. 1—Profile section drawing of the practical new type.
Figure 2:
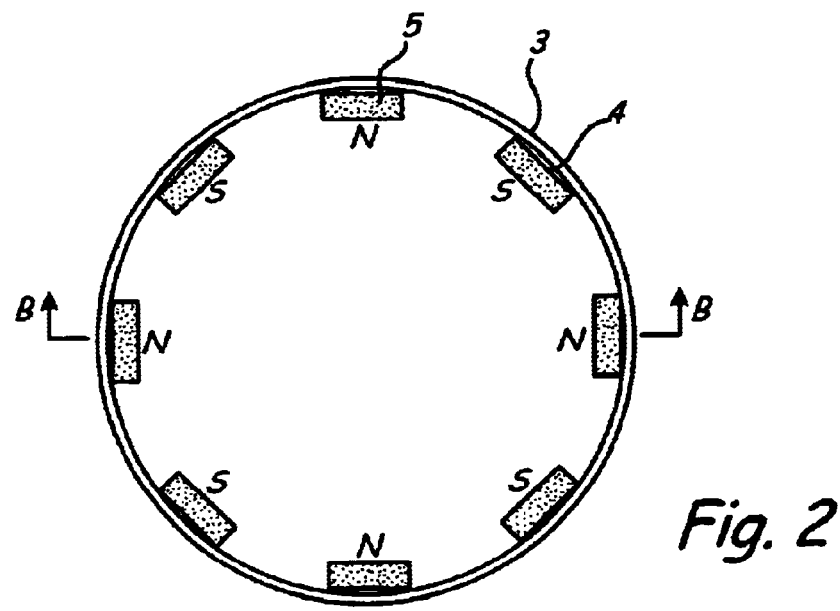
FIG. 2—Top view of magnetic circuits arrangement.
Figure 3:
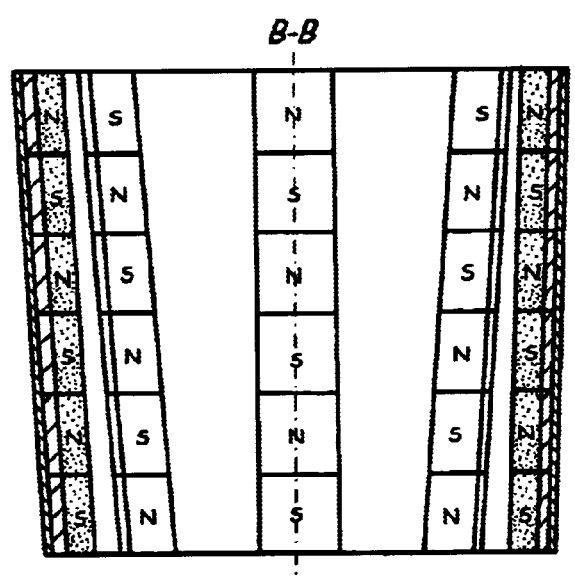
FIG. 3—Cross section of magnetic circuits arrangement.
Figure 6:
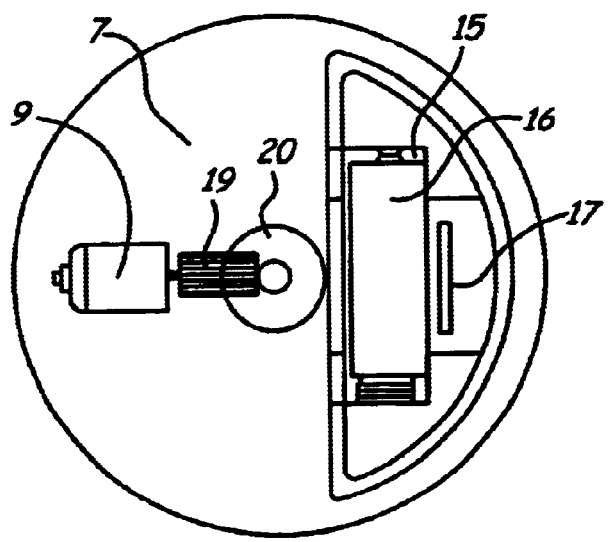
FIG. 6—Top view of the outer cover structure.
Figure 7:
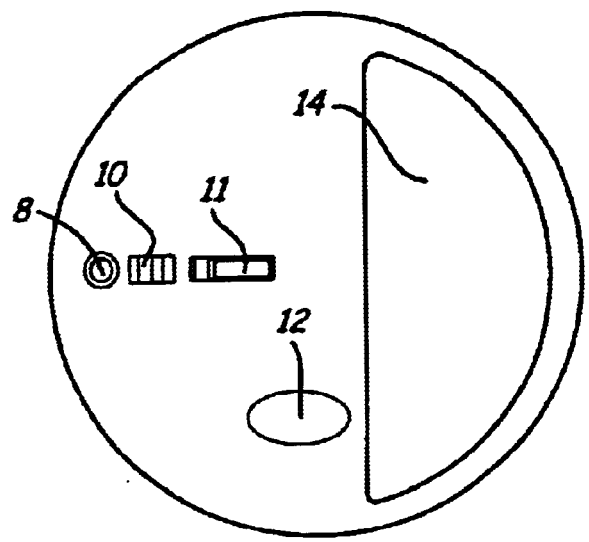
FIG. 7—Outlook of the outer cover, viewed from top.

This new type has these features: Thermostat Sleeve 2, which serves as a support to the Inner Flask, is installed between Outer Casing 1 and Inner Flask 6. Along the circumference of Thermostat Sleeve 2, a number of rectangular slots are made perpendicular to the circumferential plane (As shown in FIGS. 4 and 5, the number of slots and their measurements is determined by the diameter of Inner Flask 2, but the number must be an even number). The two poles (Pole N and Pole S) of Permanent Magnets 5 stick tightly to Inner Flask 6 and Magnetic Conductor 4 respectively. Magnetic Field Shield 3 holds the outer wall of Magnetic Conductor 4 along the circumferential direction (as shown in FIG. 2 and FIG. 3). Electric Motor 9 is mounted on Outer Cover Base 18. Mounted on the shaft of Electric Motor 9, there is Worm 19; mounted on Outer Cover Base 18, there is Worm Gear with Shaft 20; these constitute a transmission mechanism. Stirrer 22 is installed on Worm Gear with Shaft 20.

Besides, Permanent Magnets 5 are arranged like this: Poles are spaced with Pole N and Pole S one next to the opposite, forming layers of web-shaped magnetic circuits. Installed on Outer Cover 7, there are Power Supply Outlet 8, Micro Humming Loudspeaker 10, Speed Governor 11, Power Switch 12, Battery Box 15, Battery 16 and Circuit Board for Electronic Control 17. Worm Gear with Shaft 20 is located with Oiled Bearing 21. Outer Cover 7 and Outer Cover Base 18 are connected with bolts, covering on the edge of Inner Flask 6.

Inner Flask 6, Outer Casing 1, Thermostat Sleeve 2, Permanent Magnets 5, Magnetic Conductor 4 and Shield 3 are assembled together into a whole block, and then it is installed into Outer Cover 7. The connecting interface is sealed with sealing adhesive. Cover Plate 14 for Battery Box 15 are connected to Outer Cover 7 through Hinge 13.

This new type has the following advantages: The structure is fresh, the effect is evident, the adaptation is wide, applicable to both human health care and plant growing and animal-raising. In the human health care, hospitals chose 42 cases of patients high in blood sugar, cholesterol, or triglyceride, and low in high dense lipoprotein for experiments. Inspections showed a sharp contrast in blood indexes before drinking the human active water and after drinking it for 4 months. Of the 42 cases, 41 restored to normal values of their blood sugar, cholesterol, triglyceride, and high dense lipoprotein; the only one case which did not restore to normal values also had some improvements on the indexes. Thus the total effect rate was 100%. Of 15 cases of constipation, 13 got rid of it after drinking the human active water for 10 days, and they resumed defecating normally; 2 felt relief, and returned to normal after drinking the water for 2 months. The total was also 100% effective. As for plant growing, a contrastive experiment was done on vegetable growing in earth with bio-active water prepared by this new type and with ordinary tap water. Products were increased by large margins: Radish increased by 103%, cucumber by 82%, potato by 62%, string bean by 67%, tomato by 44.8%, lettuce by 46%. Undoubtedly, spreading the application of the active water preparation device will bring about enormous social and economic effects.

What is claimed is:

1. A kind of device for preparing active water comprising:

an outer casing, a thermostat sleeve, a magnetic field shield, a magnetic conductor, permanent magnets, an inner flask, an outer cover, a power supply outlet, an electric motor, a speed governor coupled to the electric motor for controlling a revolution speed of the electric motor, a power switch, a battery box comprising a cover hinge, a cover plate, and a battery, a circuit board for an electronic control, an outer cover base, a worm, a worm gear with a shaft, an oiled bearing and a stirrer, wherein the thermostat sleeve is installed between the outer casing and the inner flask along the circumference of the thermostat sleeve, the thermostat sleeve having a number of rectangular slots which are perpendicular to a circumferential plane of the sleeve; the permanent magnets and the magnetic conductor are installed in the rectangular slots of the thermostat sleeve; the magnetic field shield holds an outer wall of the magnetic conductor along a circumferential direction; an electric motor is mounted on the outer cover base; mounted on a shaft of the electric motor is the worm; mounted on the outer cover base is the worm gear with shaft; the worm meshes with the worm gear with shaft, the electric motor, worm and worm gear constituting a transmission mechanism; and the stirrer being installed on the worm gear with shaft.

2. A kind of device for preparing active water according to claim 1, wherein the two poles (N and S) of the permanent magnets stick tightly to the inner flask and magnetic conductor, respectively; and the permanent magnets are arranged such that, longitudinally, pole N and pole S of each magnet are spaced so as to be next to the opposite poles of adjacent magnets, forming web-shaped magnetic circuits.

3. A kind of device for preparing active water according to claim 1, wherein the outer cover has mounted thereon: the power supply outlet, the battery box, the battery, and the power switch; and the speed governor and the circuit board for electronic control are on the outer cover.

4. A kind of device for preparing active water according to claim 1, wherein the oiled bearing is configured for locating the worm gear with shaft.

5. A kind of device for preparing active water according to claim 1, wherein the outer cover and the outer cover base are connected with bolts, covering the edge of the inner flask.

\* \* \* \* \*